United States Patent
Mettenleiter et al.

(10) Patent No.: US 7,508,496 B2
(45) Date of Patent: Mar. 24, 2009

(54) METHOD FOR DRIVING A LASER SCANNER

(75) Inventors: Markus Mettenleiter, Argenbuehl-Elsenharz (DE); Martin Breitner, Wangen (DE); Christoph Froehlich, Wangen (DE)

(73) Assignee: Z+F Zoller & Froelich GmbH, Wangen IM Allgaeu (DE)

( * ) Notice: Subject to any disclaimer, the term of this patent is extended or adjusted under 35 U.S.C. 154(b) by 0 days.

(21) Appl. No.: 11/259,210

(22) Filed: Oct. 27, 2005

(65) Prior Publication Data

US 2006/0109536 A1  May 25, 2006

(30) Foreign Application Priority Data

Nov. 16, 2004 (DE) .................. 10 2004 055 344
Jun. 13, 2005 (DE) .................. 10 2005 027 208

(51) Int. Cl.
*G01C 3/08* (2006.01)
(52) U.S. Cl. ................................. 356/4.01
(58) Field of Classification Search ......... 356/4.01–4.1, 356/3.01–3.15, 5.01–5.15, 6–22, 28, 28.5
See application file for complete search history.

(56) References Cited

U.S. PATENT DOCUMENTS

| | | | |
|---|---|---|---|
| 4,531,052 A * | 7/1985 | Moore | 235/404 |
| 5,831,717 A | 11/1998 | Ikebuchi | |
| 6,034,803 A | 3/2000 | Sullivan et al. | |
| 2003/0036827 A1 * | 2/2003 | Murphy | 701/3 |
| 2005/0200832 A1 * | 9/2005 | Kawai et al. | 356/4.01 |

FOREIGN PATENT DOCUMENTS

| | | |
|---|---|---|
| DE | 195 44 770 | 6/1996 |
| DE | 199 10 667 | 9/2001 |
| DE | 202 08 077 | 9/2002 |
| DE | 101 51 982 | 4/2003 |
| DE | 103 61 869 | 7/2005 |
| EP | 1 001 251 | 5/2000 |
| GB | 2263592 A * | 7/1993 |
| JP | 07-134178 * | 5/1995 |
| JP | 07-134179 * | 5/1995 |
| JP | A 07-134178 | 5/1995 |
| JP | A 63-106587 | 5/1998 |
| JP | 2004-065926 * | 9/2004 |

* cited by examiner

*Primary Examiner*—Thomas H Tarcza
*Assistant Examiner*—Luke D Ratcliffe
(74) *Attorney, Agent, or Firm*—Oliff & Berridge, PLC

(57) ABSTRACT

What is disclosed is a method for driving a laser scanner, comprising a beam deflection system for a laser beam emitted by a laser light source, wherein a minimum distance to be observed is determined in dependence on the laser power of the laser light source. During the measurement the detected object distance is compared with this minimum distance, and the laser light source is deactivated and/or the laser power is reduced if the detected object distance is less than the minimum distance. There is moreover disclosed a laser scanner for implementing this method.

7 Claims, 1 Drawing Sheet

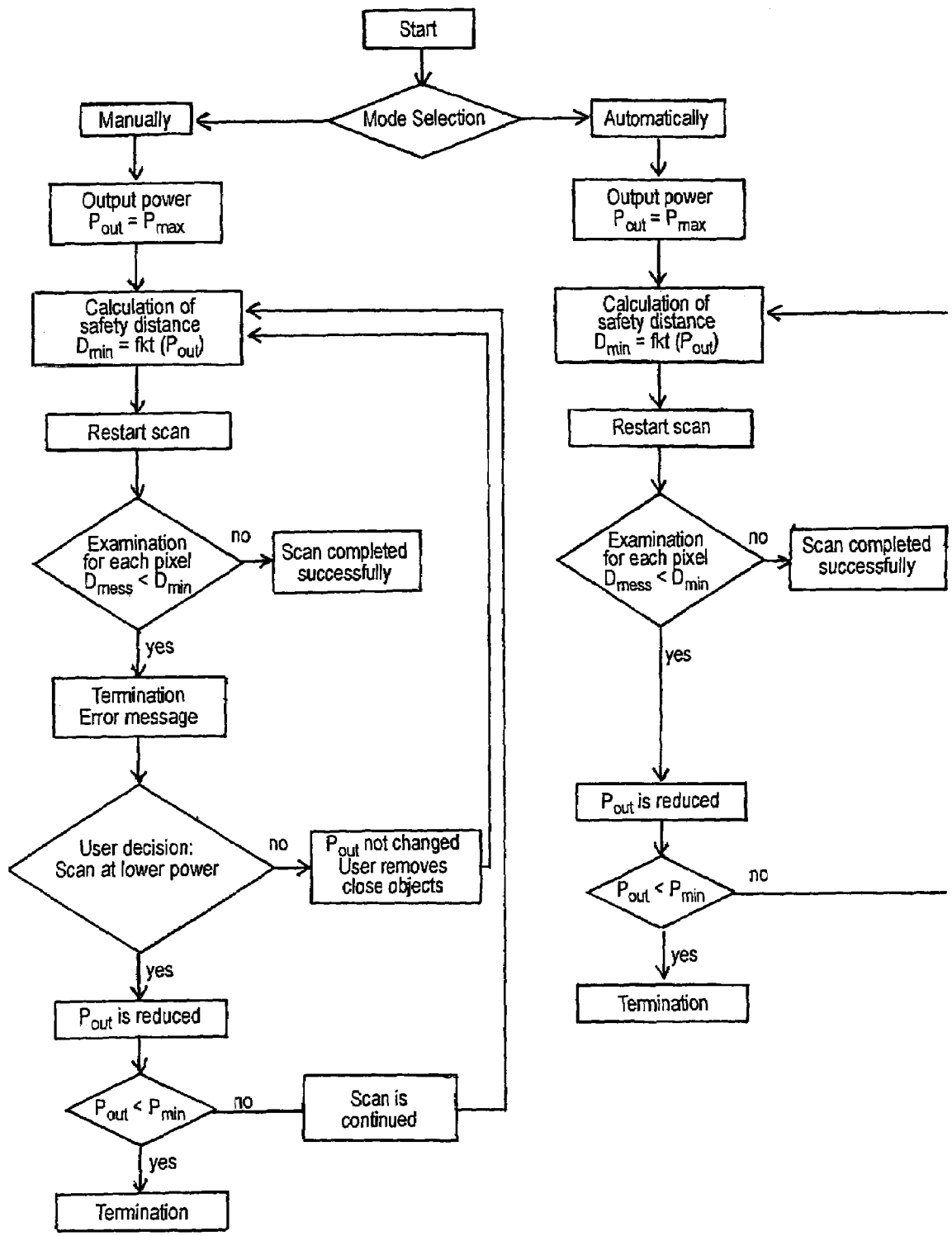

METHOD FOR DRIVING A LASER SCANNER

The invention concerns a method for driving a laser scanner in accordance with the preamble of claim 1 and a laser scanner for implementing such a method.

In 3-D scanners the laser measurement beam output by an optical emitter is deflected by a mechanical beam deflection system such that a space-filling, three-dimensional survey of surroundings is made possible. The digitized measurement data is stored on a computer system and is available there for further processing and for visualization of the surveyed object and/or of the surroundings.

A 3-D survey is carried out by guiding the modulated laser light over the surroundings to be surveyed, wherein both the distance value and the reflectivity value may be measured punctually for different directions in space. The arrangement of all the surveyed points in space results in distance and reflectivity images. The distance images represent the geometry of the surroundings, and the reflectivity images represent the visual images thereof, in analogy with the halftone images of a black-and-white photograph. Both images correspond in terms of pixels and are largely independent of environmental influences owing to the independent, active illumination with laser light.

The spatial beam deflection in a like measurement system is performed by the so-called mechanical deflection unit as known, e.g., from U.S. Pat. No. 6,034,803 A1. This beam deflection system includes a mirror whereby the laser measurement beam output by an emitter is directed at an object. The mirror is mounted so as to be rotatable through 360° about an axis of rotation arranged coaxially or in parallel with the measurement beam axis of the emitter. The exit angle of the measurement beam may be modified by means of a pivoting mechanism whereby the inclination angle of the mirror may be modified relative to the measurement beam axis. In this known solution, the pivotal axis of the mirror is mounted on a yoke and carries at an end portion a gear meshing with a rack that is supported on a control cam by a control roller. This control cam is designed so that upon the above mentioned rotation of the mirror the inclination angle is modified, whereby it is possible to scan the surrounding space. In order to make sure that the control roller of the rack is reliably supported on the control cam during the rotation, the pivotal axis is acted upon by resetting weights such that the rack is biased towards the control cam.

From EP 1 001 251 A1 a laser positioning system is known wherein the mechanical deflection unit comprises two rotatably mounted mirrors, to each of which a respective actuation motor is associated. By suitably driving these mirrors it is also possible to perform a 3-D survey.

In DE 202 08 077 U1 an improved 3-D laser measurement system is disclosed, wherein a mirror is mounted in a rotary head which is in turn received in a measuring head pivotable about a vertical axis. The rotary head receiving the mirror includes an exit window for the laser beam that is covered by a disc and inclined obliquely to the exiting measurement beam in order to reduce reflections. This 3-D scanner may also be utilized under unfavorable operating and climatic conditions.

From the standards for laser safety (EN/IEC 60825-1 etc.) there result for particular laser safety classes particular limit values for the maximum permissible light energy incident on an object within a particular time period, in order to exclude a risk to humans.

In laser ranging devices (LIght Detection And Ranging: LIDAR) employed for surveying purposes in the public domain, there is on the one hand a necessity to limit the emitted laser power to a degree that is not damaging to the human eye, i.e., to observe a corresponding safety class. On the other hand a maximum possible laser power must be emitted for an optimum quality of the measurement results. According to the laser safety standard EN/IEC 60825-1, various safety classes may be defined for various ranges of distance around laser beam sources. Here it must be made sure that areas in which laser emissions hazardous to the human eye are present can not be entered, or that the emitted power of the laser light source has only such a magnitude as not to constitute a hazard to the human eye. The standard specifies as a "test object" for determining the laser safety class a circular measurement aperture having a diameter of 7 mm, corresponding to a human pupil adapted to darkness. I.e., in accordance with this standard the laser scanners described at the outset may, strictly speaking, only be operated with a laser power at which the human eye is not endangered. Moreover solutions are known where the laser scanner is deactivated as soon as a previously defined measurement area is entered by a human being.

Owing to circular scanning of the surroundings, the maximum permissible laser power depends on the distance of the measurement object. The described 7-mm measurement aperture covers, when viewed from the center of deflection, a substantially greater angular range in the close range and accordingly impacts longer than at a greater distance at a given deflection velocity of the laser beam. The divergence of the laser radiation only has a marginal influence on this, for laser radiation having a low divergence will as a rule be utilized for measurement purposes. Thus it is possible to calculate a maximum permissible scanning period of the measurement aperture, and based on this calculate a minimum aperture distance for a particular laser power and deflection velocity. This minimum aperture distance is the distance hereinafter referred to as the minimum distance.

The invention is based on the object of furnishing a method for driving a laser scanner, and a laser scanner for implementing the method, where a hazard owing to laser emissions is minimized to a reasonable risk.

This object is attained by the features of claim 1 with regard to the method, and by the features of claim 6 with regard to the laser scanner.

The FIGURE is a flow chart showing a manual and an automatic stepwise reduction of the laser power when the distance is less than a minimum distance.

In accordance with the invention, initially a minimum distance from the laser light source which a measurement object must satisfy is determined as a function of the emitted laser power. This predetermined minimum distance is compared with the object distance detected during the measurement, and the laser light source is deactivated or its emitted laser power is decreased if the detected object distance is less than the predetermined minimum distance. In the most general form, this reduction may be carried out manually following the issue of a corresponding warning from the machine control, or may be carried out automatically.

In the case of automatic reduction, the laser power is reduced in comparison with the originally set value by a control unit, and in dependence on this a new minimum distance is calculated, and subsequently the detected object distances are compared—for each pixel—with the new minimum distance. If the distance then is again less than the minimum distance, the laser power is reduced further until the calculated minimum distance is observed or the minimum laser power is reached—in which case the laser light source is deactivated automatically. Owing to this multi-stage reduction of laser power until the minimum distance depending on it is observed, it is reliably possible to avoid a hazard owing to the laser beam to a person accidentally entering into the measurement area.

For the operator's information a corresponding message is preferably displayed in a display upon a reduction of the laser power or deactivation of the laser light source.

The laser scanner according to the invention is executed with suitable means for calculating the minimum distance as a function of the set laser beam power and for comparing the object distance measured during a scan with the calculated minimum distance, and for reducing the laser power or deactivating the laser light source if the distance is still lower than the minimum distance—optionally even after repeated reductions of the laser power.

In a case where the distance is less than the minimum distance for only a short period, for instance because an interfering object again moved out of the measurement area, the laser power may again be increased after a particular period during which persistently only greater object distances than specified by the minimum distance were measured.

The laser scanner in accordance with the invention is preferably executed with a display for displaying a message that the minimum distance is not being observed and therefore the laser beam power must be reduced manually or is automatically reduced by stages.

Further advantageous developments of the invention are subject matter of further subclaims.

In the following a preferred embodiment of the invention is explained by way of a flow chart showing a manual and an automatic stepwise reduction of the laser power when the distance is less than a minimum distance.

It shall be assumed that a 3-D laser scanner as described in DE 202 08 077 U1 is being operated in accordance with the method of the invention. Such a 3-D laser scanner comprises a measuring head pivotable about a vertical axis, on which a rotary head is mounted which is continuously rotatable about a horizontal axis of rotation. The rotary head receives a mirror of a beam deflection system whereby the laser measurement beam emitted by a laser light source, e.g. a laser diode, is directed at a measurement object. Owing to the rotatable mount of the rotary head, this measurement beam rotates about the horizontal axis of rotation, so that practically a vertical plane is scanned. By pivoting the measuring head about 180° it is then possible to scan nearly through 360° with the exception of a comparatively small dead angle. The laser beam reflected by the measurement object is received by means of the rotary head, deflected by the mirror, and evaluated by an evaluation unit including an optical receiver, wherein the propagation time of the laser light and thus the distance of the measurement object (object distance) from the scanner may be deducted from the phase shift between the emitted signal and the scattered light detected with the aid of the receiver, while the amplitude of the detected scattered light corresponds to the intensity value and depends on the reflectivity and the distance of the measurement object. It is thus possible to produce range images as halftone images, wherein a corresponding grey scale value is associated to each distance value. The intensity images may equally be represented as halftone images, wherein dark surfaces (low reflectivity) appear black, and bright surfaces (high reflectivity) appear white. This kind of grey scale value coding is very familiar to the human eye and renders the evaluation of recorded laser data on site very easy without requiring any complex data processing.

The laser beam source is standardly operated at an optical power of, e.g., 24 to 30 mW (CW power).

Despite this low power the laser beam must not impinge directly on the human eye for a prolonged period of time. In accordance with the invention, measures are therefore taken in order to avoid a direct and continued impact on a person by a laser beam having this power, if a person enters into the scanned range by accident. In order to both be able to operate within an extended range of distance at a maximum possible laser power, and at the same time not allow the monitored laser range to become too large (close objects can not be surveyed as the system explained in more detail in the following is not able to differentiate between humans and objects), a multi-stage method is preferably employed. To each "stage" a particular laser power is associated, and thus a minimum distance, below which the distance may not drop in order to observe the demanded laser safety class. During the surveying process, all the distance values detected by the laser scanner are monitored. If an object, whether object or person, is closer to the laser light source than permitted by the corresponding minimum distance, the laser light source is switched to a lower laser power corresponding to the next "stage."

This stage is monitored in turn, and if the distance becomes less than the minimum distance, switching to another stage with an even smaller minimum distance and an even lower emitted laser power is performed.

This results in the creation of several modes wherein operation takes place with a stepwise reduced laser power, and to which minimum distances from the laser light source equally reduced stepwise are associated. The highest stage, i.e., the stage of minimum hazard, exhibits a very low minimum distance of 0 or 100 mm (in accordance with the standard) from the laser light source as well as the lowest emitted laser power—this lowest emitted laser power as a rule corresponds to a deactivation of the laser.

Details of the method shall now be explained by reference to the flow chart. Upon activation of the 2-D or 3-D laser scanner it is initially determined in the program point "Mode Selection" whether measurement area monitoring is to take place "automatically" or "manually." At the beginning of the automatic measurement, as a rule initially the maximum laser power ("output power $P_{max}$") is set, and depending on this the maximum output power the required safety distance $D_{min}$ is set. Subsequently the scanning "Scan" takes place, wherein a comparison with the minimum distance $D_{min}$ is performed for the measurement object distance $D_{mess}$ of each pixel. In a case where the object distance $D_{mess}$ is less than the minimum distance $D_{min}$, i.e., if the minimum distance is not observed, the measurement is terminated immediately, and the laser power $P_{out}$ is reduced so as to be lower than the previously set maximum laser power $P_{max}$. Depending on this newly set laser power $P_{out}$, a calculation of the safety distance $D_{min}$ is again performed, and scanning "Scan" then takes place at the reduced laser power. The above described cycle is repeated until the detected object distance $D_{mess}$ for each pixel is greater than the minimum distance $D_{min}$ calculated depending on the reduced laser power $P_{out}$. In other words, the laser power is reduced until the required safety distance or minimum distance can be observed.

If the interfering object is positioned in such close proximity to the scanner that the distance is still less than the minimum distance even when the laser power was reduced to a minimum ($P_{min}$), scanning is terminated.

If the minimum distance is observed, scanning is then performed with the correspondingly set stage of laser power—in this way it is ensured that a person entering into the scanned range by accident can not be injured by the laser light.

In a case where the minimum distance is to be monitored manually, initially—like in the automatic process—the suitable maximum laser power $P_{max}$ is set and the corresponding minimum distance $D_{min}$ is determined. Scanning is started, and the object distance $D_{mess}$ for each pixel is determined. If the minimum distance $D_{min}$ is being observed, scanning takes place with the maximum laser power $P_{max}$. For a case in which the minimum distance $D_{min}$ is not being observed, the laser is deactivated, the scan is terminated, and an error message is output by the control unit, e.g., acoustically and/or via a display. The operator may then decide whether to reduce the laser power or whether to remove the interfering object from the measurement area. Following removal of the interfering object or reduction of the laser power $P_{out}$, the safety distance $D_{min}$ is again determined and compared with the measured object distances, and the cycle starts anew. For the sake of safety, it is furthermore examined upon reduction of the laser power $P_{out}$ whether this reduced laser power is greater than a predetermined minimum value $P_{min}$ of the laser power. If the laser power is less than this minimum value, scanning is terminated.

It is therefore the particularity of the above described method that scanning is not simply—like in known solutions—interrupted, but the laser power is manually or automatically reduced by stages in order to reduce the minimum distance to such an extent that it is less than the distance of the interfering object from the laser scanner, and the scan may thus be completed successfully. Only if this interfering object is situated in such close proximity to the laser light source that the distance is still less than the minimum distance even at maximum reduction of the laser power, scanning is terminated altogether. Thanks to this technique the operational safety of the laser scanner may be enhanced substantially in comparison with conventional solutions, with scanning while observing the safety standards still being possible, thanks to the reduction of the laser power, if an interfering object is situated within an originally defined safety distance; this is not possible with conventional solutions.

What is disclosed is a method for driving a laser scanner, comprising a beam deflection system for a laser beam emitted by a laser light source, wherein a minimum distance to be observed is determined in dependence on the laser power of the laser light source. During the measurement the detected object distance is compared with this minimum distance, and the laser light source is deactivated and/or the laser power is reduced if the detected object distance is less than the minimum distance. There is moreover disclosed a laser scanner for implementing this method.

The invention claimed is:

1. A method for driving a stationary laser scanner for performing a 3-D survey, comprising a beam deflection system for a laser beam emitted by a laser light source, wherein the beam deflection system deflects the laser beam through almost 360° with a predetermined deflection velocity and the laser light source has a predetermined maximum laser power $P_{max}$ and a predetermined minimum laser power $P_{min}$, the method comprising the steps of:

calculating a minimum aperture distance $D_{min}$ based on a determined maximum permissible scanning period of a 7 mm measurement aperture for the predetermined minimum laser power $P_{min}$ and the predetermined deflection velocity;

comparing an object distance $D_{mess}$ detected during a measurement with the minimum distance $D_{min}$;

reducing the laser power $P_{out}$ to the minimum laser power $P_{min}$, if the detected object distance $D_{mess}$ is less than the minimum distance $D_{min}$;

monitoring the object distance $D_{mess}$ for a predetermined period of time; and increasing the laser power, if the object distance $D_{mess}$ increases during the predetermined period of time, wherein the predetermined minimum laser power $P_{min}$ corresponds to a deactivation of the laser scanner.

2. The method in accordance with claim 1, wherein, before the laser $P_{out}$ is reduced to the minimum laser power $P_{min}$, the laser power $P_{out}$ is reduced through an intermediary of a control unit, and a correspondingly new, reduced minimum distance $D_{min}$ is calculated, and subsequently the detected object distances $D_{mess}$ are compared with the reduced distance $D_{red}$, this cycle being repeated until the calculated $D_{min}$ distance is observed or the minimum laser power $P_{min}$ is reached.

3. The method in accordance with claim 1, wherein a corresponding message is displayed when the laser power $P_{out}$ is reduced.

4. A stationary laser scanner for performing a 3-D survey for implementing the method in accordance with claim 1, comprising a laser light source for emitting a laser measurement beam, and comprising a beam deflection system for spatial deflection of this measurement beam through almost 360° with a predetermined deflection velocity, wherein the laser light source has a predetermined maximum laser power $P_{max}$ and a predetermined minimum laser power $P_{min}$ wherein the laser scanner comprises:

a calculation means for calculating a minimum aperture distance $D_{min}$ based on a predetermined maximum permissible scanning period of a 7 mm measurement aperture for the predetermined minimum laser power $P_{min}$ and the predetermined deflection velocity; and a control means for comparing the predetermined minimum distance $D_{min}$ with a detected object distance $D_{mess}$, reducing the laser power $P_{out}$ to the minimum laser power $P_{min}$ if the detected object distance $D_{mess}$ is less than the minimum distance $D_{min}$, monitoring the object distance $D_{mess}$ for a predetermined period of time, and increasing the laser power if the object distance $D_{mess}$ increases during the predetermined period of time, wherein the predetermined minimum laser power $P_{min}$ corresponds to a deactivation of the laser scanner.

5. The laser scanner in accordance with claim 4, wherein the calculation means is further adapted to calculate a new reduced minimum distance $D_{red}$ corresponding to a reduced laser power $P_{red}$, and the control means is further adapted to reduce the laser power $P_{out}$ to the reduced laser power $P_{red}$, and subsequently compare the detected object distances $D_{mess}$ with the reduced distance $D_{red}$, and to repeat the calculation, the laser power reduction and the comparison until the calculated minimum distance $D_{min}$ is observed or the minimum laser power $P_{min}$ is reached.

6. The laser scanner in accordance with claim 5, comprising a memory for storing the minimum distances $D_{min}$ depending on the laser power $P_{out}$, and means for reading out a minimum distance $D_{min}$ depending on a set laser power $P_{out}$.

7. The laser scanner in accordance with claim 4, comprising a display for displaying a message that the minimum distance $D_{min}$ is not being observed and that the laser beam power $P_{out}$ is being reduced.

* * * * *

UNITED STATES PATENT AND TRADEMARK OFFICE
CERTIFICATE OF CORRECTION

PATENT NO. : 7,508,496 B2 Page 1 of 1
APPLICATION NO. : 11/259210
DATED : March 24, 2009
INVENTOR(S) : Markus Mettenleiter, Martin Breitner and Christoph Froehlich It is certified that error appears in the above-identified patent and that said Letters Patent is hereby corrected as shown below:

Title Page,
Please correct the Assignee as follows:
 (73) Assignee: Z+F ZOLLER & FROEHLICH GmbH, Wangen im Allgaeu, Germany Title Page,
Please correct the Foreign Application Priority Data as follows:
 (DE) 10 2004 055 344.0
 (DE) 10 2005 027 208.8

Signed and Sealed this

First Day of September, 2009

David J. Kappos
*Director of the United States Patent and Trademark Office*